(No Model.)
F. B. SMITH.
NOZZLE FOR SPRINKLERS.
No. 264,354. Patented Sept. 12, 1882.
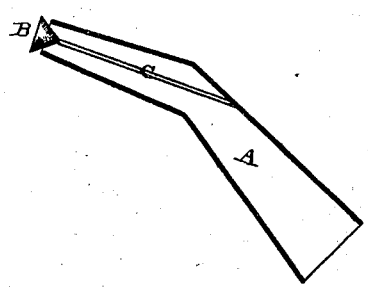
Witnesses.
A. Johnson
W. H. Kern
Inventor.
F. B. Smith,
per
F. A. Lehmann,
Atty.

UNITED STATES PATENT OFFICE.

FERNANDO B. SMITH, OF WILMOT, OHIO.

NOZZLE FOR SPRINKLERS.

SPECIFICATION forming part of Letters Patent No. 264,354, dated September 12, 1882.

Application filed July 1, 1882. (No model.)

*To all whom it may concern:*

Be it known that I, F. B. SMITH, of Wilmot, in the county of Stark and State of Ohio, have invented certain new and useful Improvements in Nozzles for Sprinklers; and I do hereby declare the following to be a full, clear, and exact description of the invention, such as will enable others skilled in the art to which it pertains to make and use it, reference being had to the accompanying drawing, which forms part of this specification.

My invention relates to an improvement in nozzles for sprinklers; and it consists in the combination of a nozzle of any suitable construction with a conical or other shaped spreading device and a spring-wire, as will be more fully described hereinafter.

The object of my invention is to secure the spreading device in the center of the end of the discharge-tube by means of a spring-wire, so that no matter in what position the spreading device may be moved it will instantly spring back into place as soon as it is left free to move, and thus always remain in the center of the discharge-tube, so as to throw an even spray.

The accompanying drawing represents my invention.

A represents a discharge tube or nozzle of a force-pump or any other device through which fluid is being forced, and B the conical or other shaped device which is placed in the end of the tube for the purpose of spraying fluid evenly in all directions. Instead of this spraying device being secured rigidly in the tube, as has generally been the case, it is here held in place by a spring-wire, C, which extends backward any suitable distance in the tube, and is then secured to the tube by solder or other means. This wire being elastic, it allows the spreading device to be forced freely against any one of the sides of the tube, so as to allow substances in the water to pass out, and then as soon as the device is left free to move it will at once spring back into place again. Very frequently substances of different kinds will be drawn in with the water, and if the spraying device is held rigidly in position, as is generally the case, they catch upon this device, and thus choke up the discharge-pipe. Where, however, the spraying device can be moved freely to one side, it will automatically give before the pressure of the substance, and thus let it freely escape, and then the spraying device will fly back into position again.

Where a spring is used, as here shown, it is almost impossible to clog the spraying device, unless substances which are entirely too large to make their escape should get into the water.

Having thus described my invention, I claim—

The combination of a discharge-tube, a spraying device, and a spring-wire, the spraying device being fastened to the wire in such a manner that it will always spring back to the center of the tube when left free to move.

In testimony whereof I affix my signature in presence of two witnesses.

FERNANDO B. SMITH.

Witnesses:
E. R. THORNBURG,
W. S. PUTMAN.